United States Patent [19]
Ohta et al.

[11] Patent Number: 4,773,187
[45] Date of Patent: Sep. 27, 1988

[54] NUMERICALLY CONTROLLED GRINDING MACHINE

[75] Inventors: Norio Ohta, Okazaki; Tadashi Yamauchi, Kariya, both of Japan

[73] Assignee: Toyoda Koki Kabushiki Kaisha, Kariya, Japan

[21] Appl. No.: 25,650

[22] Filed: Mar. 13, 1987

[30] Foreign Application Priority Data

Mar. 28, 1986 [JP] Japan .................................. 61-72276

[51] Int. Cl.$^4$ .................................................. B24B 51/00
[52] U.S. Cl. .............................. 51/165.77; 51/165.71; 51/105 SP; 51/289 R; 364/474
[58] Field of Search ........ 51/165.71, 165 TP, 105 SP, 51/105 R, 289 R, 165.77; 364/474

[56] References Cited

U.S. PATENT DOCUMENTS

| | | | |
|---|---|---|---|
| 4,115,958 | 9/1978 | Englander et al. | 51/289 R |
| 4,205,488 | 6/1980 | Englander et al. | 51/105 SP |
| 4,294,045 | 10/1981 | Enomoto et al. | 51/165.71 |
| 4,337,599 | 7/1982 | Koide et al. | 364/474 X |
| 4,458,452 | 7/1984 | McDaniel et al. | 51/289 R X |
| 4,584,795 | 4/1986 | Akabane | 51/105 SP X |
| 4,615,149 | 10/1986 | Yoneda et al. | 51/105 SP X |

FOREIGN PATENT DOCUMENTS

| | | | |
|---|---|---|---|
| 56-52163 | 5/1981 | Japan | 51/165.74 |
| 59-53150 | 3/1984 | Japan | 51/165.77 |

*Primary Examiner*—Frederick R. Schmidt
*Assistant Examiner*—Shirish Desai
*Attorney, Agent, or Firm*—Oblon, Fisher, Spivak, McClelland & Maier

[57] ABSTRACT

A numerically controlled grinding machine provided with an angular type grinding wheel and a numerical controller for controlling the feed of grinding wheel based upon a control signal from a measuring head which measures the diameter of a cylindrical side of a workpiece. The grinding wheel is moved along an inclined path to grind the cylindrical side and a radially inner portion of the shoulder of the workpiece, simultaneously. In response to the control signal from the measuring head, the feeding of the grinding wheel is stopped. Then, the numerical controller detects the difference between a target position and a actual position of the grinding wheel along an axis of a work spindle. Further, the numerical controller compensates another target position to grind the radially outer portion of the shoulder for the difference. Thereafter, the grinding wheel is moved to the compensated target position so as to grind the radially outer portion of the shoulder.

4 Claims, 5 Drawing Sheets

NUMERICALLY CONTROLLED GRINDING MACHINE

BACKGROUND OF THE INVENTION

1. Field of the Invention

The present invention relates to a numerically controlled grinding machine and, more particularly, to a numerically controlled grinding machine having an angular type grinding wheel and a control device for controlling the feed of the grinding wheel based upon a control signal from a measuring device which measures the diameter of the cylindrical side of a workpiece.

2. Description of the Prior Art

In the case of grinding the cylindrical side and the shoulder of a workpiece simultaneously, an angular type grinding wheel is moved relative to the workpiece along an inclined path.

Moreover, where the size tolerance to the cylindrical side of the workpiece is narrow, the feed of the grinding wheel is controlled based upon a control signal from a measuring device which measures the diameter of the cylindrical side. However, a problem occurs where the width of the shoulder to be ground is wider than that of a shoulder grinding surface of the grinding wheel.

Namely, when the inner portion of the shoulder and the cylindrical side are ground, the feeding of the grinding wheel is stopped in response to the control signal from the measuring device. However, when the radially outer portion of the shoulder is ground, the feeding of the grinding wheel is stopped based upon NC data which represents the target position of the grinding wheel to grind the outer portion of the shoulder to a designed size.

If the cylindrical side grinding does not finish at a designed diameter, the ground surface of the inner portion Gbb of the shoulder Gb is offset from the designed position along a axis of the work spindle, as shown in FIG. 6. However, since the grinding of the outer portion of the shoulder is controlled based upon not the control signal from the measuring device but the NC data, the ground surface of the outer portion Gcc of the shoulder Gb exists at the designed position along the axis. Therefore, a step S is produced between the outer portion Gcc and the inner portion Gbb of the shoulder Gb, as shown in FIG. 6.

SUMMARY OF THE INVENTION

Accordingly, it is a main object of the present invention to provide an improved numerically controlled grinding machine capable of enhancing the finish accuracy of the shoulder grinding.

In summary, in the NC grinding machine according to the invention, the inner portion of the shoulder and the cylindrical side of a workpiece are ground simultaneously by feeding a grinding wheel along a path inclined to the moving direction of a wheel slide. A measuring device measures the diameter of the cylindrical side of the workpiece and sends a control signal when cylindrical side is ground to a predetermined diameter. In response to the control signal, the feeding of the grinding wheel is stopped. Then compensating means detect the difference between the actual position and the target position of the grinding wheel along the axis of the work spindle at the time when the cylindrical side is ground to a predetermined diameter. Thereafter, the compensating means compensate the target position of the grinding wheel along the axis to grid the outer portion of the shoulder for the difference. Then, grinding wheel is moved to the compensated target position to grind the outer portion of the shoulder. Since, the target position of the grinding wheel to grind outer portion of the shoulder is compensated for the difference between the target position and the actual position of the grinding whel at the time when the inner portion of the shoulder is ground, the position of the ground outer portion and inner portion of the shoulder are in the same plane across the axis. Therefore, there is produced no step between inner and outer portion of the shoulder.

In another embodiment of the invention, the compensating means compensate the current position data in a register by storing the data representing the target position of the grinding wheel at the time when the inner portion of the shoulder is ground to a predetermined dimension. The compensation of this embodiment has the same result as the above mentioned compensation.

BRIEF DESCRIPTION OF THE DRAWINGS

The above and other objects, features and attendant advantages of the invention will be appreciated as the same becomes better understood by reference to the following detailed description of the preferred embodiments of the invention when considered in connection with the accompanying drawings, in which like reference characters denote like parts in the various views.

DETAILED DESCRIPTION OF THE PREFERRED EMBODIMENTS

Figure 1:
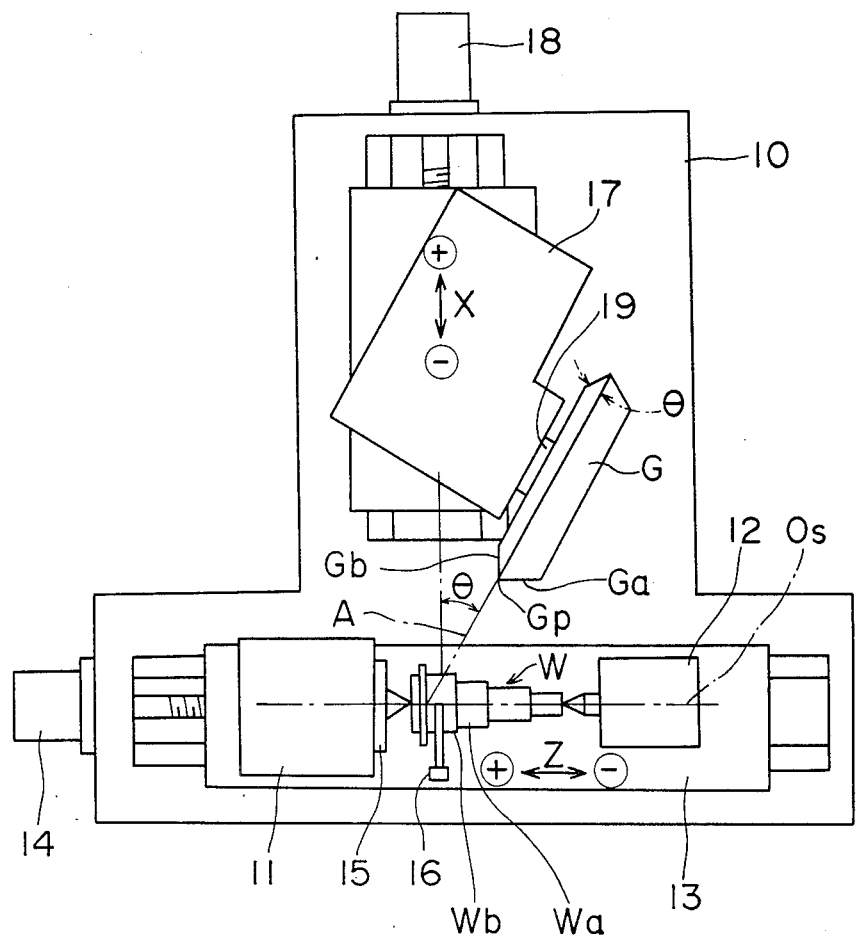
FIG. 1 is a schematic plan view of a numerically controlled grinding machine according to the invention.

Referring to FIG. 1, there is shown a numerically controlled (NC) grinding machine embodying the concept of the present invention. This machine has a bed 10 on which a worktable 13 is placed. A headstock 11 and a tailstock 12 are mounted on the worktable 13, and a workpiece W is rotatably held between the headstock 11 and the tailstock 12. A work spindle 15 is connected to an electric motor (not shown) to drive the spindle 15. When the spindle 15 is rotated, the workpiece W is turned. The worktable 13 is connected to a servomotor 14 via a feed screw mechanism (not shown) so as to be moved along a Z-axis that is parallel to the axis Os of the spindle 15. A measuring head 16, which measures the diameter of the cylindrical side Wa of the workpiece W, is mounted on the worktable 13 and is movable toward and away from the workpiece W.

A grinding wheel head 17 is mounted at the rear of the bed 10 in such a way that the wheel head 17 can move back and forth along an X-axis that is perpendicular to the axis Os of the spindle 15. The wheel head 17 is connected to a servomotor 18 via a feed screw mechanism (not shown) so that the wheel head 17 can be moved by the motor 18. A wheel shaft 19 that is rotated by an electric motor (not shown) is carried in the wheel head 17. A grinding wheel G of the angular type is mounted on the wheel shaft 19. The wheel G has a cylindrical grinding surface Ga parallel to the axis Os of the spindle 15 and a shoulder grinding surface Gb perpendicular to the surface Ga. The tip Gp of the grinding wheel G is located within a plane which is inclined at an angle of $\theta$ to the X-axis.

Figure 2:
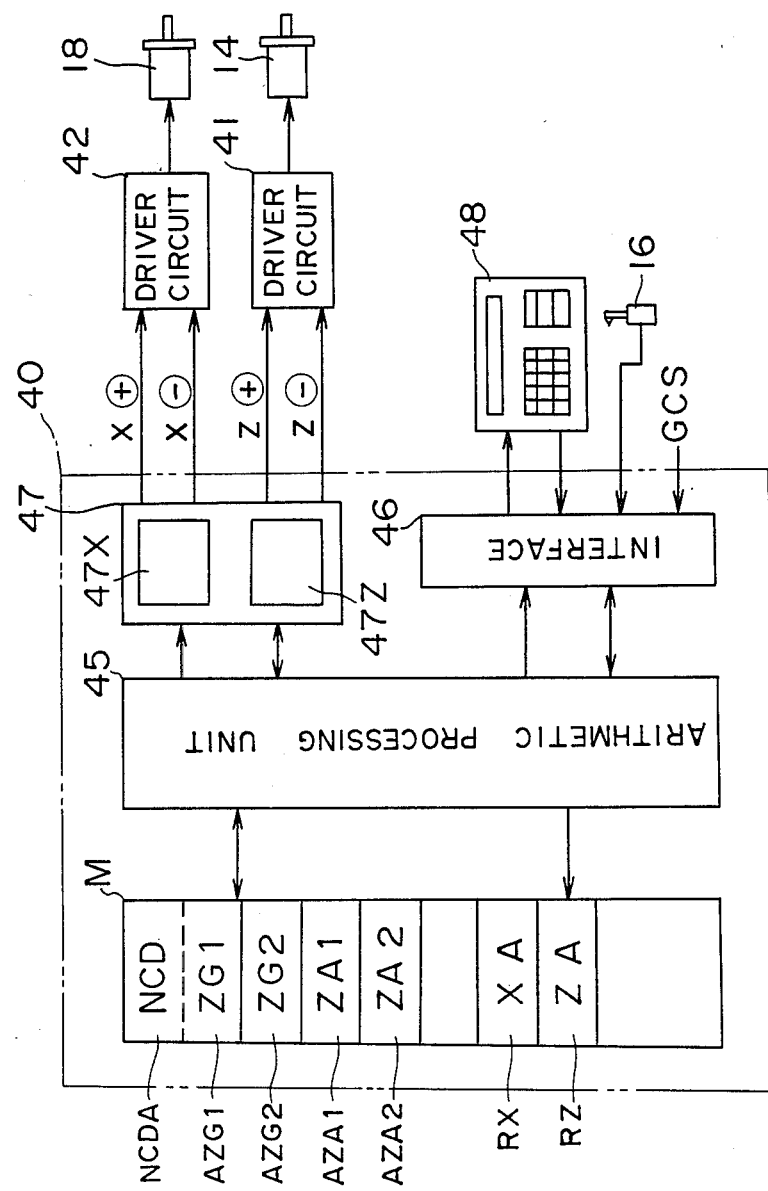
FIG. 2 is a block diagram of a control circuit for controlling the machine shown in FIG. 1.

Referring to FIG. 2, there is shown a control circuit for controlling the grinding machine constructed as described above. A numerical controller is generally indicated by numeral 40. Driver circuits 41 and 42 drive the aforementioned servomotors 14 and 18, respectively. The numerical controller 40 distributes pulses to the driver circuits 41 and 42 to control the machining of the workpiece W. The numerical controller 40 comprises an arithmetic processing unit 45, a memory M, an interface 46 and a pulse generator 47. Connected with the interface 46 are a data entry device 48 and the measuring head 16. The output terminals of the pulse generator 47 are connected with the driver circuits 41 and 42.

Figure 5:
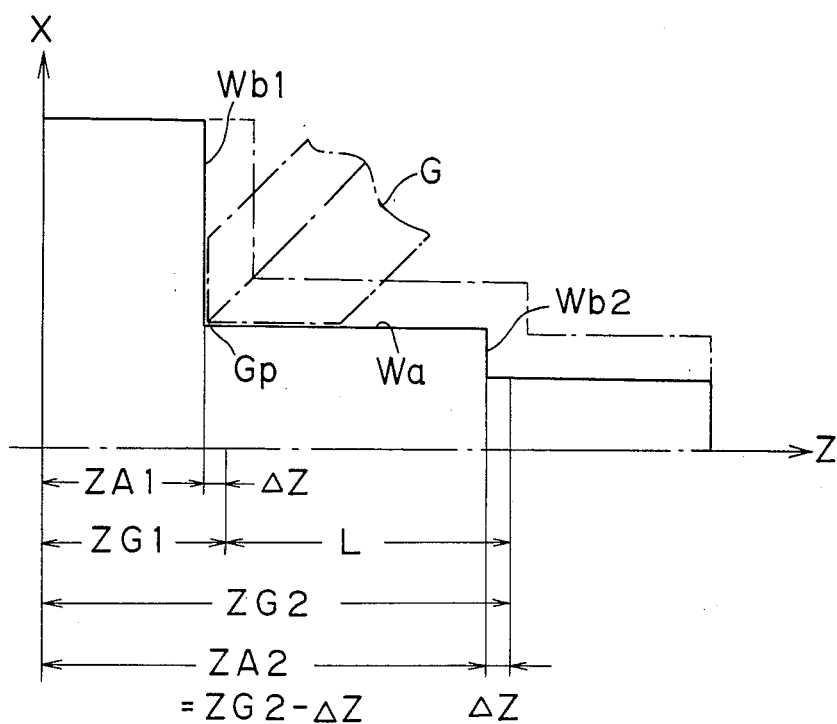
FIG. 5 is an explanatory view showing the positional relationship between the grinding wheel and the workpiece.
Figure 6:
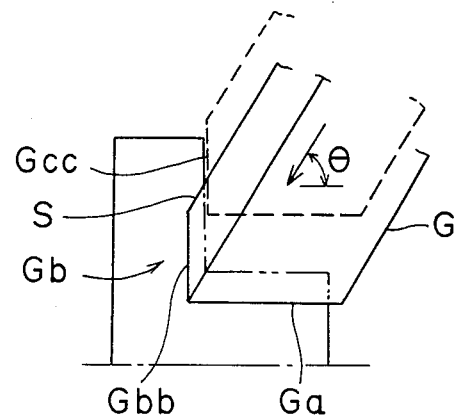
FIG. 6 illustrates a conventional grinding method of the cylindrical side and the radially wide shoulder of a workpiece.

The memory M includes registers RX and RZ for storing data concerning the present position XA of the cylindrical grinding surface Ga along the X-axis and the present position ZA of the shoulder grinding surface Gb along the Z-axis. The positions XA and ZA represent the coordinates of the tip Gp of the grinding wheel G. The memory M further includes an NC data area NCDA. An NC program for a workpiece grinding cycle is written to the NC data area NCDA by the data entry device 48. The memory M further includes memory areas AZG1, AZG2, AZA1, AZA2. The areas AZG1 and AZG2 memorize the Z-axis target position ZG1, ZG2 of the grinding wheel G to grind the shoulders Wb1, Wb2 of the workpiece W, respectively, as shown in FIG. 5. The areas AZA1 and AZA2 memorize compensated values ZA1, ZA2 of the Z-axis target positions ZG1, ZG2.

Figure 3:
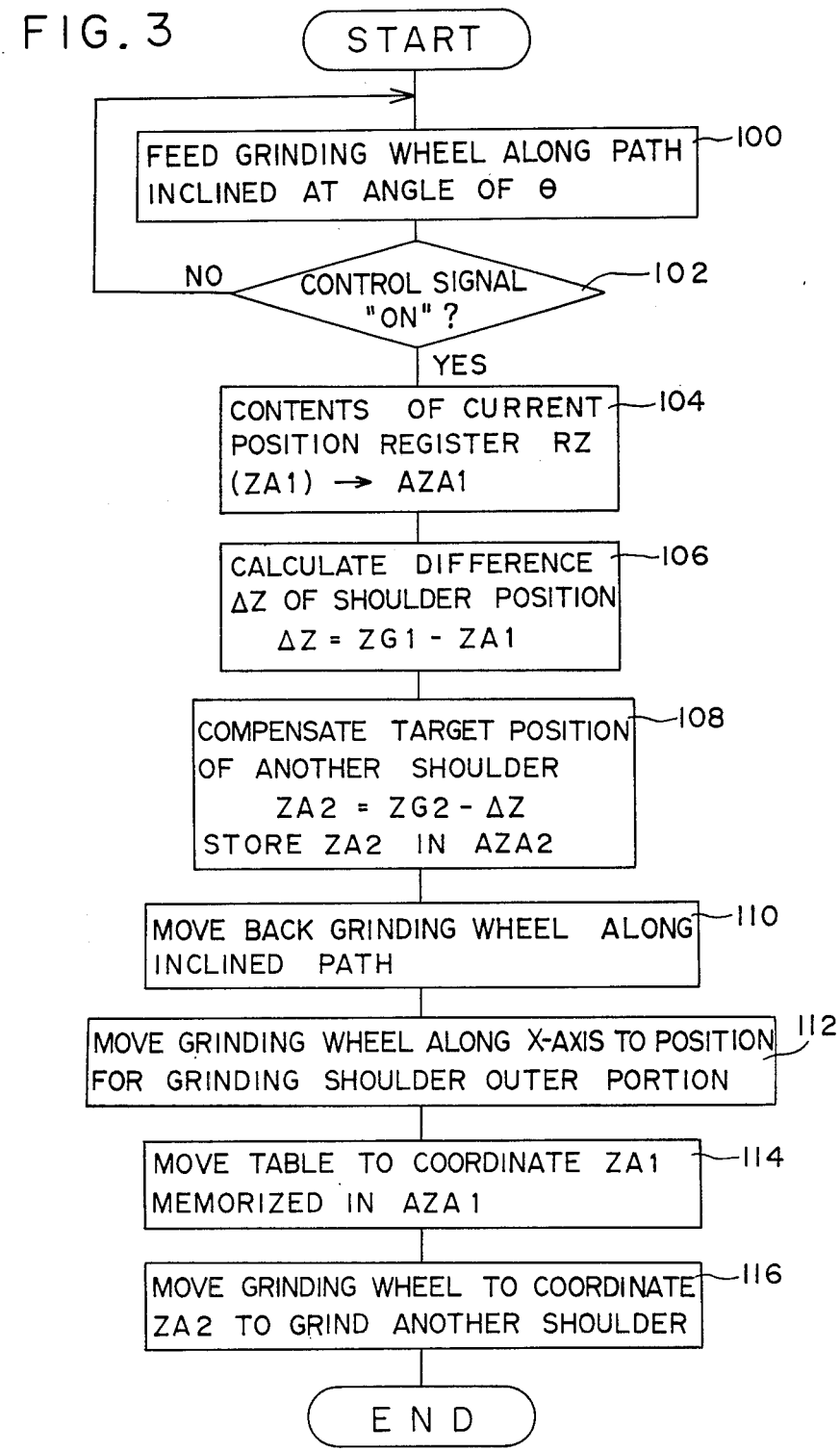
FIG. 3 is a flow chart illustrating the processings performed by the arithmetic processing unit shown in FIG. 2 for the machining of the grinding machine.

When an instruction GCS for starting a machining operation is given to the arithmetic processing unit 45, the unit 45 performs the NC program which is illustrated as a flow chart in FIG. 3. First, the unit 45 causes the pulse generator 47 to generate X-axis pulses and Z-axis pulses, simultaneously, in such a way that the grinding wheel G is moved along a path which is inclined at an angle of $\theta$ to the X-axis to grind the cylindrical side Wa and the inner portion of the shoulder Wb1 of the workpiece W, simultaneously (step 100).

When the cylindrical side Wa is ground to a predetermined diameter, a control signal is sent from the measuring head 16. In response to the control signal from the measuring head 16, the unit 45 causes the pulse generator 47 to stop pulse generation (step 102). Then, the data of the current position AZ1 which represents the Z-axis coordinate of the tip Gp is read from the register RZ and is stored in the memory area AZA1 (step 104). Further, a deviation $\Delta Z$ of the ground inner portion of the shoulder surface Wb1 is calculated by subtracting the Z coordinate ZA1 of the actual position of the grinding wheel G from the Z coordinate ZG1 of the target position of the grinding wheel G (step 106).

Thereafter, a compensated Z coordinate ZA2 of the target position of the grinding wheel G to grind the shoulder Wb2 is calculated by subtracting the deviation value $\Delta Z$ from the Z coordinate ZG2 of the target position to grind the shoulder Wb2. Then, the compensated Z coordinate AZ2 is stored in the area AZA2 (step 108). Thereafter, the grinding wheel G is moved back along the inclined path (step 110). Then, the grinding wheel G is moved to a predetermined position along the X-axis for grinding an radially outer portion of the shoulder Wb1 (step 112). Thereafter, the worktable 13 is moved rightward in FIG. 1 until the Z coordinate of the tip Gp reaches the Z coordinate ZA1 which is stored in the area AZA1. By the above operation, the outer portion of the shoulder Wb1 is ground (step 114). As mentioned earlier, the Z coordinate ZA1 is the Z coordinate of the tip Gp when the control signal is sent from the measuring head 16 in grinding the inner portion of the shoulder Wb. Consequently, the position of the outer portion and the inner portion of the shoulder Wb1 are in the same plane across the Z-axis. Accordingly, a step is not produced between the outer portion and inner portion of the shoulder.

Thereafter, the worktable 13 is moved leftward and the grinding wheel head 17 is moved along the inclined path until the Z coordinate of the tip Gp reaches the compensated Z coordinate ZA2. Consequently, the distance between the ground shoulder surface Wb1 and the shoulder surface Wb2 coincides with a designed value L correctly.

Figure 4:
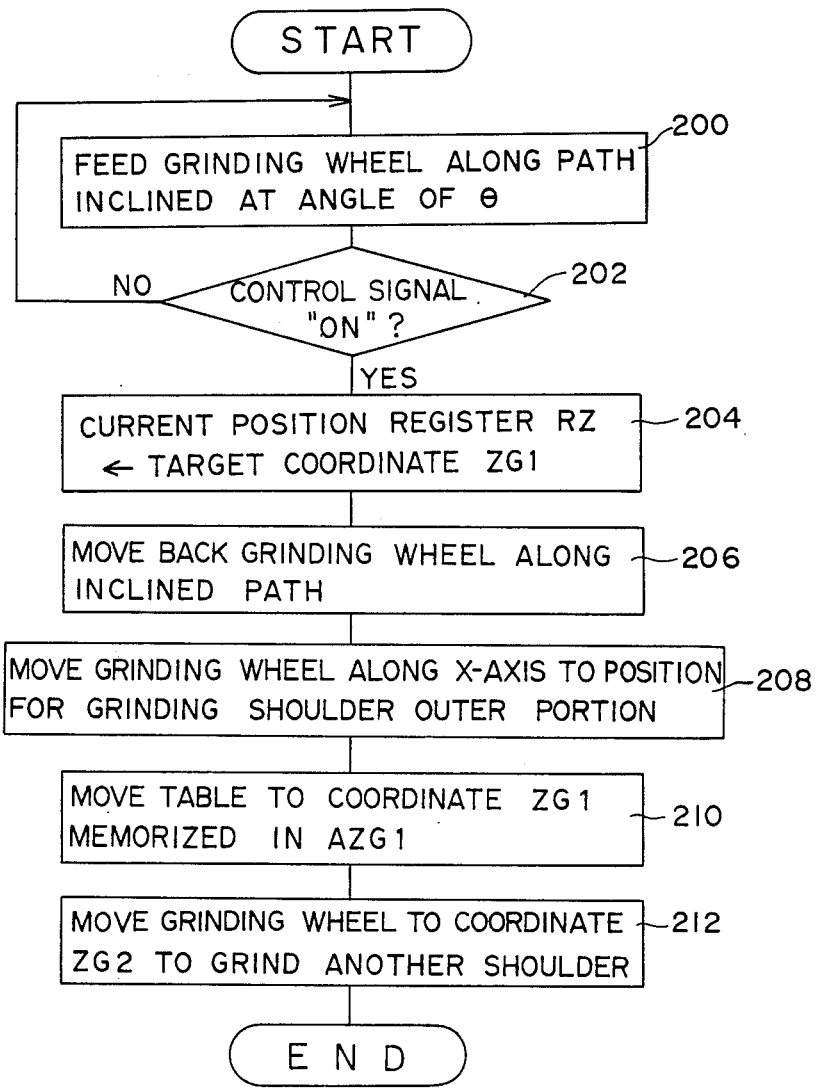
FIG. 4 is a flow chart illustrating a modified processing of that shown in FIG. 3.

FIG. 4 shows another flow chart which can be used for the invention. The processings of the steps 200, 202, 206, 208 of the flow chart are the same as those of the steps 100, 102, 110, 112 of the flow chart shown in FIG. 3. The processings of the steps 204, 210, 212 are equivalent to those of the steps 104, 106, 108, 114, 116 of the flow chart shown in FIG. 3. More specifically, when the control signal is sent from the measuring head 16, the Z coordinate ZG1 of the target position of the grinding wheel G to grind shoulder Wb1 is stored in the register RZ (step 204). Consequently, the current position data in the register RZ is compensated for the difference z between the actual Z cordinate of the tip Gp and the Z coordinate ZG1 of the target position of the grinding wheel G. Then, the outer portion of the shoulder Wb1 is ground based upon the Z coordinate ZG1 (step 210). Consequently, the longitudinal positions of the ground outer portion and inner portion of the shoulder Wb1 are located in the same plane across the Z-axis, and there is produced no step between the outer portion and inner portion of the shoulder Wb1. Thereafter, the another shoulder Wb2 is ground based upon the Z coordinate ZG2 (step 12). Since the Z coordinate of the tip Gp is compensated for $\Delta Z$ at the step 204, the distance between the ground shoulder surface Wb1 and the ground shoulder surface Wb2 coincides with the designed value L.

Having now fully set forth both structure and operation of the preferred embodiments of the concept underlying the present invention, various other embodiments as well as certain variations and modifications of the embodiments herein shown and described will obviously occur to those skilled in the art upon becoming familiar with the underlying concept. It is to be understood, that within the scope of the appended the invention may be practiced otherwise than as specifically set forth herein.

What is claimed is:

1. In a numerically controlled grinding machine having a grinding wheel head movable relative to a workpiece which is held on a work table for rotation about a work spindle, and which has a cylindrical side and a shoulder portion adjacent to said cylindrical side;

a grinding wheel rotatably mounted on said grinding wheel head, the grinding wheel having a cylindrical grinding surface which is parallel to the work spindle and a shoulder grinding surface which is perpendicular to the cylindrical grinding surface wherein the width of said shoulder grinding surface is narrower than the width of said shoulder portion;

at least one register for storing data concerning the present position of the grinding wheel along an axis of the work spindle, the improvement comprising:

a measuring device for measuring the diameter of the cylindrical side of the workpiece so as to send a control signal when the cylindrical side is ground to a predetermined diameter;

first feed control means for feeding said grinding wheel relatively along a path which is inclined to the work spindle axis to grind a cylindrical side and a shoulder of the workpiece simultaneously until said control signal is sent, and for retracting said grinding wheel relatively along said path after completion of said feed;

detecting means for detecting the present position of the grinding wheel stored in said register at the time when said control signal is sent from said measuring device; and second feed control means for feeding said grinding wheel relatively along said axis until said present position of the grinding wheel coincides with said detected present position so as to grind the outer portion of said shoulder of the workpiece.

2. A numerically controlled grinding machine as set forth in claim 1, wherein said workpiece has another shoulder addition to said shoulder and said second feed control means feed the grinding wheel relatively to grind said another shoulder of the workpiece.

3. In a numerically controlled grinding machine having a grinding wheel head movable relative to a workpiece which is held on a work table for rotation about a work spindle, and which has a cylindrical side and a shoulder portion;

a grinding wheel rotatably mounted on said grinding wheel head, the grinding wheel having a cylindrical grinding surface which is parallel to the work spindle and a shoulder grinding surface which is perpendicular to the cylindrical grinding surface, wherein the width of said shoulder grinding surface is narrower than the width of said shoulder portion;

at least one register for storing data concerning the present position of the grinding wheel along an axis of the work spindle, the improvement comprising:

a measuring device for measuring the diameter of the cylindrical side of the workpiece so as to send a control signal when the cylindrical side is ground to a predetermined diameter;

first control means for feeding said grinding wheel relatively along a path which is inclinded to the work spindle axis to grind a cylindrical side and a should of the workpiece simultaneously until said control signal is sent, and for retracting said grinding wheel relatively along said path after completion of said feed;

changing means for changing the data in said register by storing data representing the theoretical target position of the grinding wheel along the axis to grind the shoulder of the workpiece at the time when the control signal is sent from said measuring device; and second feed control means for feeding said grinding wheel relatively along said axis until said present position stored in said register coincides with said theoretical target position so as to grind the outer portion of said shoulder of the workpiece.

4. A numerically controlled grinding machine as set forth in claim 3, wherein said workpiece has another shoulder in addition to said shoulder and said second feed control means feed the grinding wheel relatively to grind said another shoulder of the workpiece.

* * * * *